March 14, 1950 G. WUERTHNER 2,500,589
COLLAPSIBLE HAND TRUCK
Filed Jan. 10, 1949 2 Sheets-Sheet 1
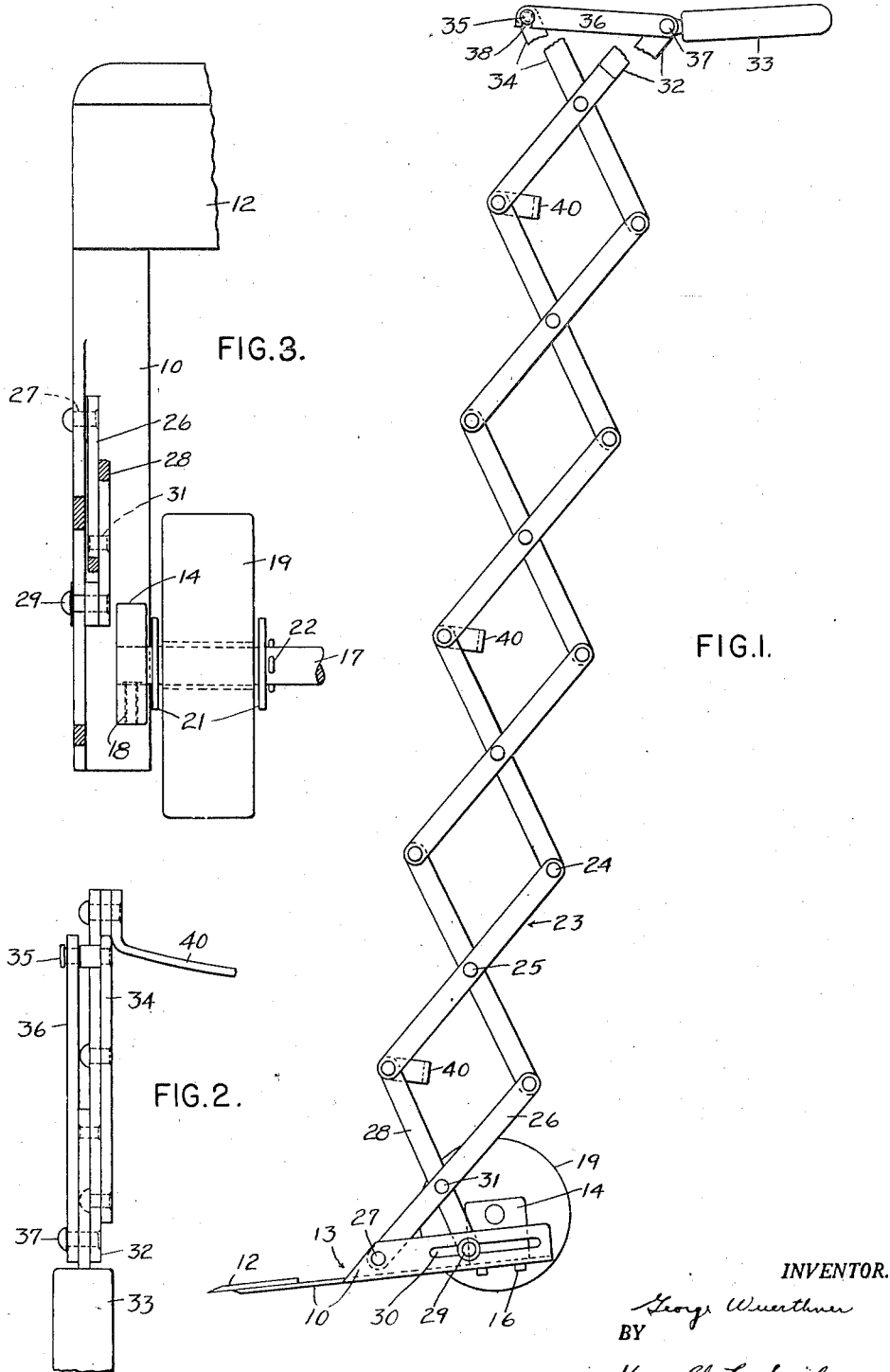
INVENTOR.
George Wuerthner
BY
Harold F. Scribner INVENTOR.
George Wuerthner
BY Harold F. Scribner Patented Mar. 14, 1950

2,500,589

UNITED STATES PATENT OFFICE 2,500,589

COLLAPSIBLE HAND TRUCK

George Wuerthner, Linden, N. J.

Application January 10, 1949, Serial No. 70,033

8 Claims. (Cl. 280—36)

The present invention relates to mobile carriers and is concerned more particularly with a carrier of the hand-truck type useful in the transporting of crates, boxes, barrels and like articles.

A primary aim of the invention is the construction of a relatively light weight hand-truck constructed in a manner effectively to carry the maximum load a man would be expected to handle.

A further aim of the invention is to provide a rugged serviceable carrier that may be collapsed into a fraction of its extended size whereby to make the carrier capable of stowing away in a small space, e. g. under the driver's seat of a truck so as to be readily transported from place to place with the trucking vehicle.

Still a further objective of the invention is the construction of a hand-truck type of carrier in which the truck wheels are positioned within the main framing as to be out of the way in transporting a load through narrow aisles or in compacted areas.

The invention also aims to render available a carrier of the hand-truck type embodying simple yet effective means for locking the collapsible framing in its extended or working position and which admits of ready unlocking to permit collapsing of the truck when the trucking task is finished.

Insofar as I am aware the prior hand-trucks are all characterized by having one or a pair of spaced rigid shaft-like handle members that extend to the floor and carry the axle and wheels. Forward of the axle and wheels, a beveled lift plate is mounted. The wheel elements of the prior devices were mounted to the outer sides of the shafts which meant that the user not only had to watch the sides of the load placed on the truck but also the nature and width of the passageway. Moreover, the prior trucks, as above indicated, were of a rigid and relatively massive construction which made portability in a car, truck, airplane, baggage car, or like carrier, a virtual impossibility.

The present invention provides a practical solution to problems of that nature and proposes a collapsible light weight hand-truck having the usual beveled lift plate integral with a skeleton-like frame that journals the wheels. The two sides of the hand-truck of this invention are each comprised of a plurality of crossed link members, each pivoted at their ends and centers to one another forming a lazy-tong arrangement, one end being pivoted to the wheel frame, and the other end extending upward and supplied with a handle and latching means. At the juncture of selected pairs of crossing links, and disposed preferably toward the front of the carrier, cross-bow members are mounted which not only serve as ties for the side frames but also as a back support for the load that is to be moved on the truck. The planes of the cross-link side frames parallel the plane of the wheels and give to the sides tremendous strength when the truck is being tilted with its load.

In some instances it may be preferred to construct the frames of aluminum or other strong light weight material, but where extra ruggedness is desired, for example for factory or express and freight office use, it is more practical to form the frames, linkages, etc. of iron or steel and to treat the device to resist the action of weather.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 illustrates a hand-truck embodying this invention, the same being illustrated in a normal working position.

Fig. 2 is an enlarged top view of one of the side frames and a portion of the handle.

Fig. 3 is a plan view of a portion of the load platform illustrating part of the lift plate and wheel mounting.

Figure 4:
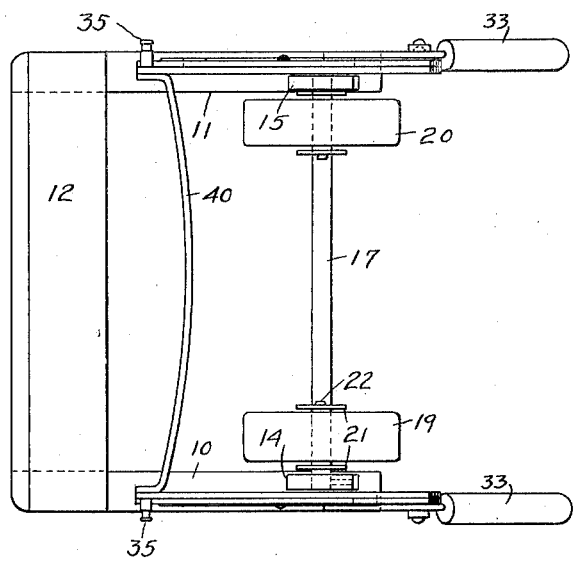
Fig. 4 is a plan view of the truck in collapsed condition.

Referring more particularly to Figs. 1 and 3, the hand truck illustrated is provided with a wheel frame composed of angle pieces 10 and 11 united at their forward ends, preferably by welding, with a transversely extending beveled lift plate 12. The angle pieces are placed so that the flanges extend toward each other and form flats for the lift plate, and their other flanges extend upwardly to form short side walls. The forward portion of the side walls are cut away as indicated at 13 to provide luggage space across the front of the truck.

Journal blocks 14 and 15 are secured to the flat portions of the angle pieces 10 and 11 respectively, at their rear. These blocks 14 and 15 may be welded to the angle pieces or fastened by screws 16 or other suitable means. A cross-shaft 17 is mounted in the blocks and preferably locked with pins or set screws 18 whereby crossbracing and rigidity is imparted to the rear portions of the truck frame.

Wheel members 19 and 20 are rotatably mounted on the shaft 17 between the side arms 10 and 11 and maintained in running position adjacent the blocks by pairs of washers 21 and lock pins 22. Any rugged wheel may be used but I prefer a solid rubber, or hard fibre wheel, having an oiless bearing for quietness and trouble free operation.

Each side frame of the truck is composed of a group of crossed link members 23, pivoted at their ends 24, to each other, and at their centers 25 where they cross. The lower terminal link 26 of each frame is fixedly pivoted, as at 27, to the upturned flange of the angle piece 10, and the other lower terminal link 28 is also connected with the upturned flange by means of a pivot pin 29 that traverses a slot 30. It will be noted (Fig. 1) that the lower arms of the terminal links 26 and 28 are of unequal length, the rear arm being the shorter, so as to give a slight rearward tilt to the side (when extended) relative to a vertical line, while the general plane of the luggage platform is slanted forward and downwardly. The proportioning should be such that with the sides extended, as illustrated, the truck will stand of its own accord.

In the embodiment illustrated, six pairs of cross-links 23 are used, but the number may be increased or reduced for a particular size truck. One of the upper terminal links 32 extends rearwardly and has fastened thereto a handle 33 of a size and length adapted to fit the hand of the user, and the other upper terminal link 34 extends forwardly and is provided with a projecting headed stud 35. A latching link 36 is pivoted as at 37 to each of the handle terminal links and is formed with an open recess 38 at its free end adapted when the frame is extended to latch over the stud 35 and secure the cross-link assembly in extended position. With the latching link in operative position, as shown in Figs. 1 and 2, the terminal links 32, 34 can neither spread nor contract. Such restraining forces are transmitted through the intermediate links to the lower terminal links 26, 28 and the latter are effectively held in fixed positions. The cross bracing or trussing of the members thus formed impart tremendous strength to the sides whereby they are enabled to transmit considerable leverage to the wheel frame members 10, 11 and 12, when the frame is tilted. Although the side frames are apparently frail and delicate, the disposition and mounting of their several components are such as to enable the user to lift and transport exceedingly heavy loads without danger of injury to himself or to the truck.

When the truck is tilted back, as in normal use, the load thereon is prevented from falling through, between the sides by means of several spaced bow members 40. The members 40 are preferably slightly U-shaped in plan and are welded or otherwise secured against sagging to the forward pivot portions of selected cross-links of each side. Both sides of the truck are composed of cross-links, as above described, however, a further point to be mentioned is that the side assemblies should be made "right" and "left" so that the handle elements 33, lug elements 35, latch links 32, sliding pivots 29, points of attachment of cross-bow members to their links, and other pivotal or fixed points, will correspond on both side of the carrier whereby the need of spacer elements or offsets on one side or the other to compensate for link thicknesses is eliminated.

Figure 5:
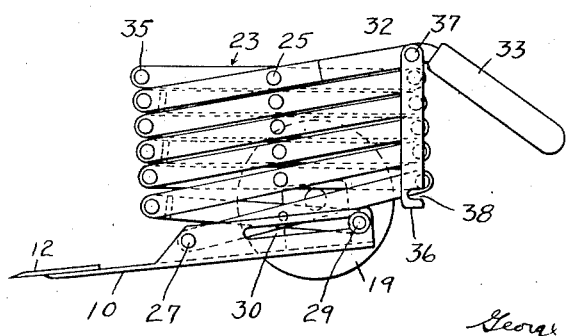
Fig. 5 is a side view of the truck in collapsed condition.

After the trucking task is completed the user unlatches the lock links 36 from the studs 35 and by exerting a downward pressure on the handles the side frames collapse into a compact stack, as illustrated in Fig. 5, which makes storing or bodily lifting of the truck a simple matter.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A collapsible hand truck for lifting and transporting a load comprising a load supporting platform composed of spaced members united at their forward ends by a lift plate and at their rearward ends by a wheel axle shaft, wheels on said shaft, a pair of side frame members each having two terminal elements pivotally secured to said supporting platform with one of the terminal elements of each frame pivotally secured to said platform at a point intermediate the wheel axle and the leading end of the lift plate, and the other terminal element of each frame pivotally secured to said platform at a point adjacent the wheel axle, each of said side frame members also comprising a plurality of crossed-link elements pivoted to said terminal elements and to one another so as to be extensible and contractible, and means operative positively to lock a pair of the link elements of each side frame against relative movement in correspondingly extended positions whereby to form relatively rigid sides to the truck operative as levers in effecting the lifting and carrying of a load.

2. The combination of claim 1 including cross bow members extending between the side frame members operative as reinforcements and as a back support for the load placed on the platform of the carrier.

3. The combination of claim 1 including cross-bow members connecting the side frame members, said cross-bow members being positioned on the side frames forward of said wheel shaft and wheels thereon.

4. The combination of claim 1 in which the said wheels are positioned between the said side frame members and rearwardly of the said lift plate.

5. A collapsible hand truck for lifting and transporting a load comprising a wheel base composed of a lift plate and a pair of arm elements extending rearwardly therefrom, a pair of traction wheels journaled between the said arms, a truck side frame pivoted to each of said arms, each side frame comprising a series of crossed-link elements pivoted at their ends and centers to each other so as to form a lazy-tong grill, spaced apart cross-bow elements secured to selected pair of crossed-link elements to afford a back support for the load, handle means secured to each side frame, and latch means operable positively to secure the crossed-links of the side frames against relative movement in extended position whereby to form sides to the truck, said sides being capable of being collapsed when said latch means is in an unlatched position.

6. The combination of claim 5 in which one of the terminal links of each side frame is fixedly pivoted to said wheel base and its companion terminal link slidably pivoted to said wheel base.

7. The combination of claim 5 in which the terminal links of each side frame are unequal in length.

8. A collapsible hand truck for lifting and transporting a load comprising a load supporting platform composed of spaced inwardly turned angle members united at their forward ends by a lift plate, a wheel shaft secured to said angle members, a pair of wheels on said shaft, side frame members pivotally secured to the upturned flanges of said spaced angle members, each of said frame members comprising a plurality of crossed-link elements pivoted to one another so as to be extensible and contractible, means operative positively to lock a pair of the crossed-link elements of the frames against relative movement in correspondingly extended positions whereby to form sides to the truck, cross bracing means extending between selected links of the side frame members to provide a back support to a load, said frames when unlocked being adapted to be collapsed compactly to render the truck conveniently storable, and handle means secured to and movable with one of the links of each of said side frame members.

GEORGE WUERTHNER.

REFERENCES CITED

The following references are of record in the file of this patent:

UNITED STATES PATENTS

| Number | Name | Date |
|---|---|---|
| 1,125,571 | Lounsbery | Jan. 19, 1915 |
| 1,592,944 | Jones | July 20, 1926 |

FOREIGN PATENTS

| Number | Country | Date |
|---|---|---|
| 404,743 | Germany | Oct. 24, 1924 |